June 2, 1925.
A. C. MACBETH
1,540,352
MOTION PICTURE MACHINE
Filed Feb. 6, 1923
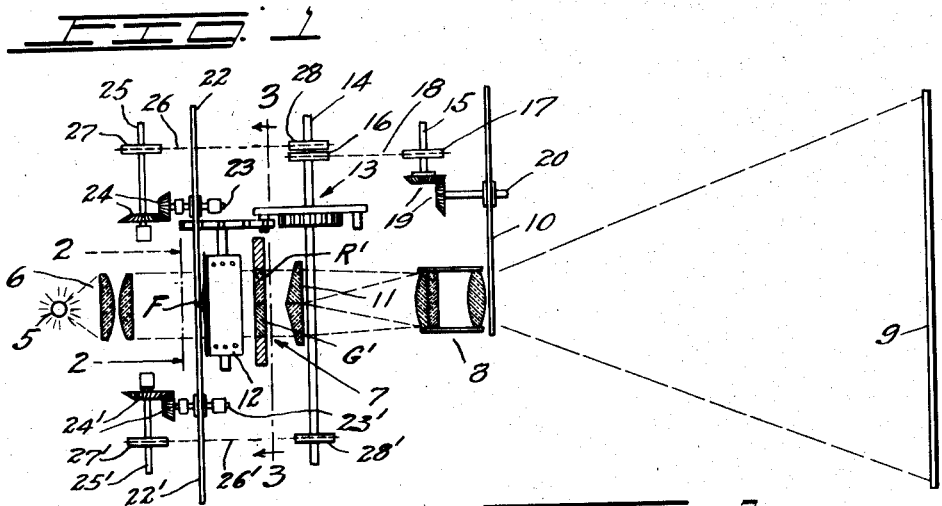
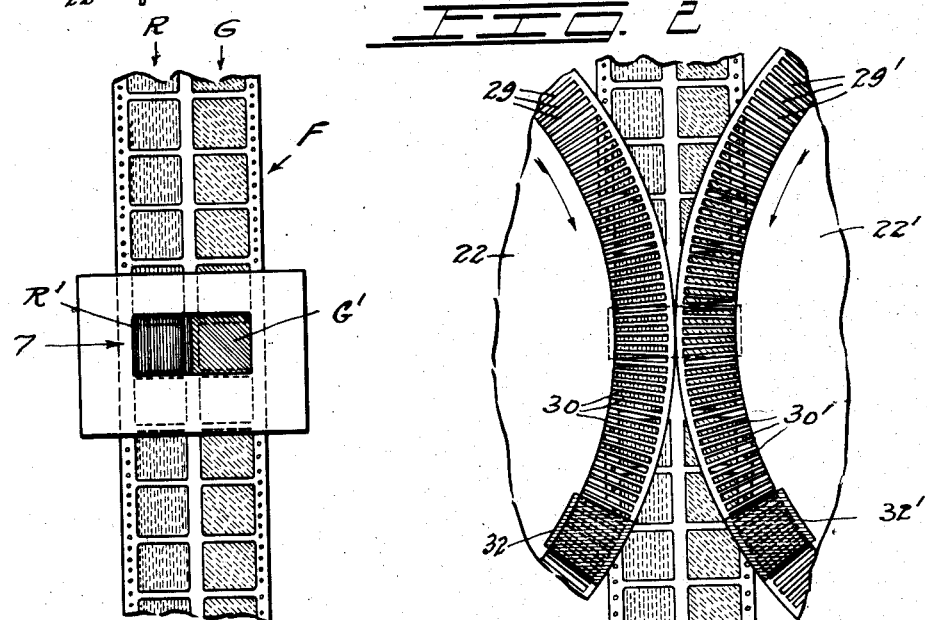
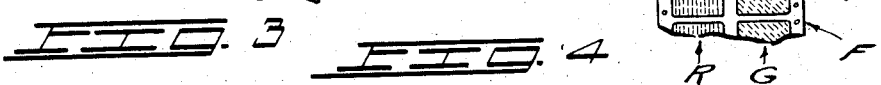
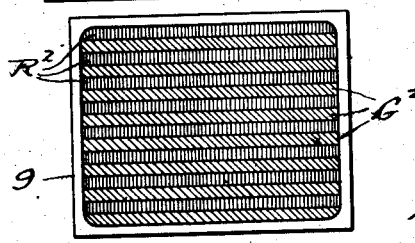
INVENTOR
Albert C. Macbeth
by
ATTORNEY Patented June 2, 1925.

1,540,352

UNITED STATES PATENT OFFICE.

ALBERT C. MACBETH, OF SEATTLE, WASHINGTON, ASSIGNOR OF ONE-HALF TO CHARLES T. ORANGE, OF SEATTLE, WASHINGTON.

MOTION-PICTURE MACHINE.

Application filed February 6, 1923. Serial No. 617,215.

*To all whom it may concern:*

Be it known that I, ALBERT C. MACBETH, a citizen of the United States, residing at Seattle, in the county of King and State of Washington, have invented certain new and useful Improvements in Motion-Picture Machines, of which the following is a specification.

This invention relates to apparatus for projecting color pictures on a screen and its object is the provision of a new manner or means whereby such results may be most efficiently attained.

Other objects and advantages of the invention will appear in the following description.

The invention in its preferred embodiment is illustrated in the accompanying drawing, in which,—

Figure 1 is a sectional plan view, shown somewhat diagrammatically, of apparatus disclosing the present invention. Figs. 2 and 3 are fragmentary sectional views through 2—2 and 3—3 of Fig. 1. Fig. 4 is a front elevational view of a screen upon which a composite color picture is represented by alternating horizontal bars.

I employ a positive film F produced from a negative or negatives the concurrent exposures of which are taken by a camera or cameras through green and red color filters in any known or suitable manner. As shown in Figs. 2 and 3, the images desired through the medium of the negative and green and red filters above referred to are represented somewhat conventionally by vertically and inclined dotted hatching.

The red and green color images indicated by R and G, respectively, on the film F are disposed in rows longitudinally of the film, the concurrent exposures being shown in horizontal relations.

In Fig. 1, the reference numeral 5 represents the source of light; 6, the condenser lens; F, the film; and 7, a window disposed at the opposite side of the film from said light and provided with red and green color filters $R^1$ and $G^1$ of glass or other suitable transparent material. 8 represents the projector; 9, the screen and 10, the shutter, all as in a kinetoscope of known construction except with respect to the filter window and the film of the present invention. 11 represent deflecting prisms for directing to the projector 8 the light rays passing through the complementary images of each successive pair of film exposures.

The shutter 10 of any suitable known type functions to eliminate flicker upon the screen 9.

The driving reel 12 for the film is afforded intermittent rotary motion as by means of a Geneva movement, denoted by 13, from a driving shaft 14 which, as illustrated, serves to rotate a second shaft 15 through sprocket wheels 16, 17 and a chain belt 18. Motion, in turn, is transmitted from shaft 15 through the medium of gear wheels 19 to the arbor 20 of the said shutter to rotate the same.

In the present invention, the film images are projected fragmentarily to produce upon the screen 9 a picture composed of alternate red and green color strata, denoted by $R^2$ and $G^2$ in Fig. 4, produced through the filter window from the successively presented companion images or exposures on the film F.

With a film provided with two rows of filter-color exposures R and G, as indicated in Figs. 2 and 3, I provide two disks 22 and $22^1$ disposed transversely of the kinetoscope and mounted upon parallel shafts 23 and $23^1$ which are driven synchronously at high speeds in directions as indicated by arrows in Fig. 2. As shown in Fig. 1, the shafts 23, $23^1$ are rotated through the medium of gear wheels 24, $24^1$ from intermediate shafts 25, $25^1$ which are driven by endles belts, indicated by 26, $26^1$, passing about sprocket wheels 27, $27^1$ and 28, $28^1$ on said intermediate shafts and the driving shaft 14. Said disks are respectively provided with series of peripherally disposed slots 29 and $29^1$, preferably arranged radially of the disk axes, the adjacent slots of the respective series being separated by bars 30 and $30^1$ of widths substantially equal to the widths of the slots.

The disks, moreover, are controlled to have the slots of one disk be in alignment with the bar elements of the other disk, or nearly so, when traversing the projecting light beam, whereby the illuminated portion of red and green color exposures are interspersed upon the screen.

This will be understood from an inspection of Fig. 4 wherein the color projections upon the screen are represented conventionally. By reason of the revolutions of the distributor slots and the bar elements, the positions of the red and green color effects upon the screen are changing one for the other to produce a motion picture composed of differently colored dissolving or blending portions.

Secured to said disks and extending across a plurality of the slots thereof are plates 32, 32¹ of glass or other transparent material and of a color such as blue or other suitable color which will serve to rectify the color effect produced by the red and green projections on the screen.

What I claim, is,—

1. In apparatus for making color projections of motion pictures from a progressively driven film provided with two series of pictures rspectively taken through different colored filters, and a source of light, of color filters, and rotary disks provided with apertures disposed to revolubly traverse the projecting light beam passing through the respective color filters and the series of film pictures, said apertures being arranged on the respective disks to simultaneously exhibit upon a screen pluralities of fractional portions of both of said series of film pictures in spaced relations with each other.

2. In apparatus for making color projections of motion pictures from a progressively driven film provided with two series of pictures respectively taken through different colored filters, and a source of light, rotary disks provided with apertures disposed to revolubly traverse the projecting light beam passing through the respective color filters and the series of film pictures, said apertures being arranged on the respective disks to simultaneously exhibit upon a screen pluralities of fractional portions of both of said series of film pictures in spaced relations with each other, and color modifying filter devices revolubly carried by said disks.

Signed at Seattle, Washington, this 23rd day of January, 1923.

ALBERT C. MACBETH.

Witnesses:
  PIERRE BARNES,
  M. G. SUPPLE.